United States Patent [19]
Longshore et al.

[11] 3,948,222
[45] Apr. 6, 1976

[54] ANIMAL SAFETY HARNESS
[75] Inventors: Frederic Longshore; Claude H. Kissling, both of San Rafael, Calif.
[73] Assignee: Lawrence Peska Associates, Inc., New York, N.Y. ; a part interest
[22] Filed: Feb. 19, 1975
[21] Appl. No.: 551,036

[52] U.S. Cl. ................................................ 119/96
[51] Int. Cl.² ..................... A01K 3/00; A01K 27/00
[58] Field of Search ............... 119/96; 298/389, 385

[56] References Cited
UNITED STATES PATENTS
3,310,034  3/1967  Dishart ................................. 119/96
3,491,726  1/1970  Partin ................................... 119/96

Primary Examiner—Hugh R. Chamblee
Attorney, Agent, or Firm—Richard E. Manfeldt

[57] ABSTRACT

An animal safety harness is used to protect an animal from injury while riding in an automobile. The animal safety harness comprises a strap assembly that secures around the forward belly, the back, the sides, and the chest of the animal. A first chain member having end snaffle snaps secures at two points to the strap assembly. A second chain member is detachably joined to the center of the first chain member and permanently affixed to the floor of the automobile.

4 Claims, 3 Drawing Figures

ANIMAL SAFETY HARNESS

SUMMARY OF THE INVENTION

Our invention relates to a unique and novel animal safety harness used in protecting an animal from injury while riding in a motor vehicle.

A number of U.S. Pat. Nos. 3,276,431; 3,310,034; 3,769,938; and 3,797,462 have employed animal restraining devices for use in an automobile, but these aforementioned patents are non-applicable to our present invention.

Accordingly, it is an object of our present invention to provide an animal safety harness easily installed in an automobile, wherein the harness device restrains the animal from jumping out of the car as well as from being thrown during a sudden braking or collision of the automobile.

Another object of our present invention is to provide a double chain assembly for securing the animal safety harness to the floor of the automobile, wherein the chain assembly is detachably secured to the animal safety harness.

Briefly, our present invention comprises a strap assembly that secures around the forward belly, the back, the sides and the chest of the dog. A first chain member having end snaffle snaps secures at two points to the strap assembly. A second chain member is detachably joined to the center of the first chain member and permanently affixed to the floor of the automobile.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
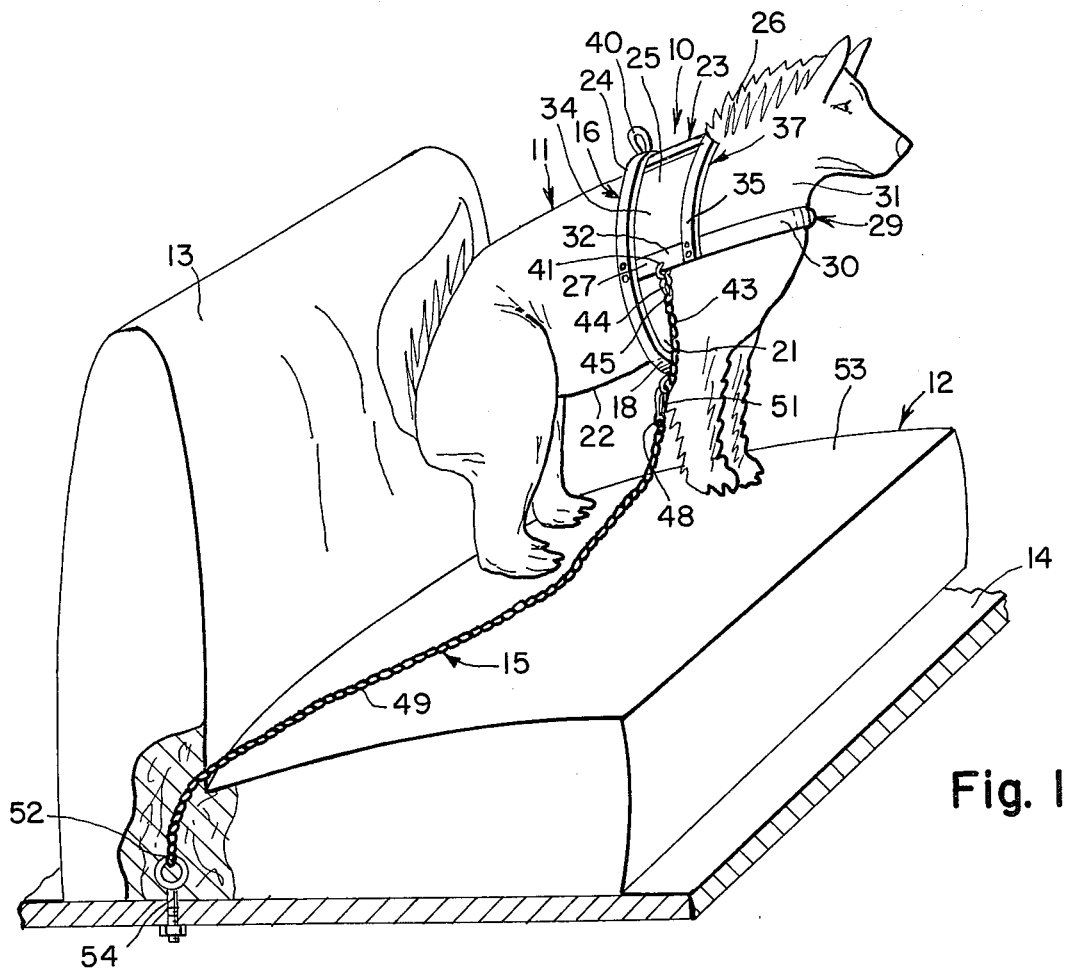
FIG. 1 illustrates a side perspective view of a dog positioned on an automobile seat, wherein the dog is contained within the animal safety harness.

Turning now descriptively to the drawings, in which similar reference characters denote similar elements throughout the several views, FIG. 1 shows an animal safety harness 10 secured onto a dog 11 positioned on a conventional styled automobile seat 12 having an upward extending backrest 13. The animal safety harness 10 is secured to the floor 14 of the automobile by a chain assembly 15.

Figure 2:
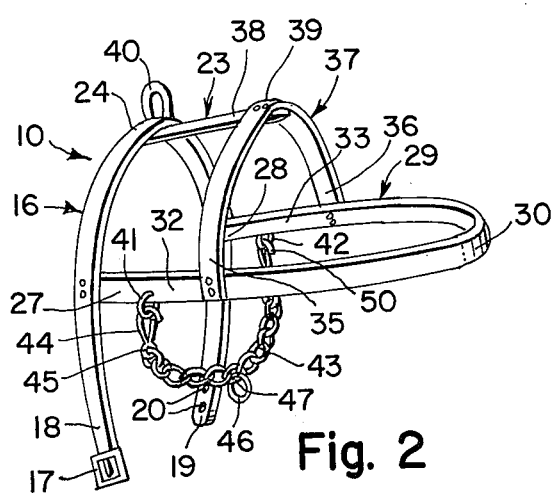
FIG. 2 illustrates a side perspective view of the animal safety harness.

FIGS. 1, 2 shows the animal safety harness 10 broadly comprising an adjustable body strap 16 that includes a buckle 17 fastened to one end 18 thereof adapted to cooperate with the other end 19 having a plurality of apertures 20 for adjustably tightening the strap 16 around the forward belly portion 21 of the dog 11, wherein the ends 18, 19 of strap 16 are joined together under the belly 22 of the dog 11. An elongated back strap member 23 is affixed to the top closed portion 24 of strap 16, wherein member 23 extends forwardly on the back 25 of the dog 11 to the nape 26 of the dog 11. The free ends 27, 28 of a U-shaped forwarding extending strap member 29 are riveted to strap 16, wherein the closed end portion 30 of member 29 engages the chest area 31 of the dog 11 and the leg portions 32, 33 of member 29 engage the sides 34 of the dog 11. The lower free ends 35, 36 of an inverted U-shaped strap element 37 are riveted to leg portions 32, 33 of member 29, wherein element 37 extends upward from member 29. The forward end 38 of member 23 is riveted to an upper closed portion 39 of element 37, wherein the upper closed portion 39 of element 37 engages the nape 26 of the dog 11. A first ring member 40 is affixed to the top portion 24 of strap 16, wherein member 40 is used for attachment of a conventional type leash (not shown). Loop members 41, 42 are joined to the leg portions 32, 33 of member 29 just forwardly of back strap 16. A first chain member 43 has a first end snaffle snap 44 and a second end snaffle span 50, wherein the snaffle snaps 44, 50 are joined to both ends of the chain member 43 by swivel mountings 45. The snaffle snaps 44, 50 engage loop members 41, 42.

Figure 3:
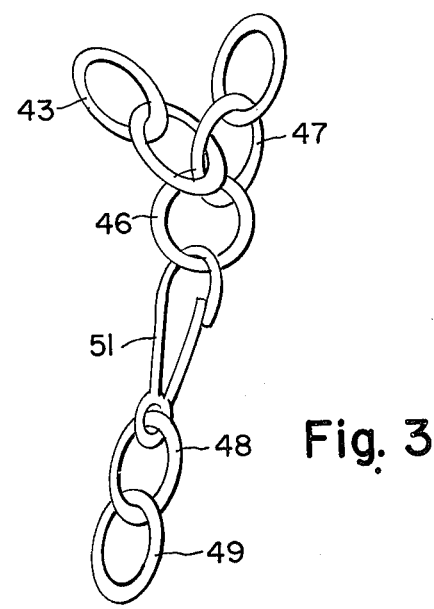
FIG. 3 illustrates a perspective of the chain anchoring assembly of the animal safety harness.

FIG. 3 shows a ring element 46 looped through a center link 47 of chain member 43. A first end 48 of a second chain member 49 has an end snaffle clip 51, wherein clip 51 secures onto ring element 46.

Referring back to FIG. 1, the second end 52 of member 49 passes downward through the juncture between the seat portion 53 and back rest 13 of the automobile seat 12, wherein the end 52 of member 49 is secured to the floor 14 of the automobile by an eye blot 54.

Hence, obvious changes may be made in the specific embodiment of the invention described herein, such modifications being within the spirit and scope of the invention claimed, it is indicated that all matter contained herein is intended as an illustrative and not as limiting in scope.

Having thus described the invention, what we claim as new and desire to secure by Letters Patent of the United States is:

1. An animal safety harness adapted to hold an animal in a fixed position on an automobile seat having a seat portion and an upwardly extending backrest, which comprises:
   a. an adjustable body strap adapted to secure around a rearward portion of said animal and to engage a belly of said animal;
   b. an elongated back strap member joined at one end thereof to a top closed portion of said body strap, said back strap member adapted to extend forwardly on a back of said animal to a nape of said animal;
   c. a pair of free ends of a U-shaped forwardly extending strap member affixed to said body strap, a closed end portion of said U-shaped strap member adapted to engage a chest area of said animal, leg portions of said U-shaped strap member adapted to engage the sides of said animal;
   d. a pair of lower free ends of an inverted U-shaped strap element affixed to said leg portions of said U-shaped strap member, an upper closed portion of said inverted U-shaped strap element joined to a forward end of said back strap member, said upper closed portion of said inverted U-shaped strap element adapted to engage said nape of said animal;
   e. a first chain member;
   f. first means for detachably securing said first chain member to said leg portions of said U-shaped strap member;
   g. a second chain member;

h. second means for detachably securing said second chain member to said first chain member; and
i. third means for permanently securing said second chain member to a floor of said automobile.

2. An animal safety harness as recited in claim 1, wherein said first means comprises:
a. snaffle snaps joined with swivel mountings to both ends of said first chain member;
b. a loop member joined to each said leg portion of said U-shaped strap members; and
c. one said snaffle snap engaging each said loop member.

3. An animal safety harness as recited in claim 2, wherein said second means comprises:

a. a snaffle clip affixed to a first end of said second chain member;
b. a ring element looped through a center link of first said chain member; and
c. said snaffle clip engaging said ring element.

4. An animal safety harness as recited in claim 3, wherein said third means comprises:
a. a second end of said second chain member extending downward through a juncture between said seat portion and said backrest; and
b. said second end of said chain member secured to said floor with an eyeblot.

* * * * *